United States Patent
Witts et al.

(10) Patent No.: US 11,921,251 B2
(45) Date of Patent: Mar. 5, 2024

(54) POSITION SENSING APPARATUS AND METHOD

(71) Applicant: KYOCERA AVX Components (Werne), GmbH, Werne (DE)

(72) Inventors: David Witts, Cambridge (GB); Peter Constantinou, Cambridge (GB); Paul Smith, Cambridge (GB)

(73) Assignee: KYOCERA AVX Components (Werne) GmbH, Werne (DE)

( * ) Notice: Subject to any disclaimer, the term of this patent is extended or adjusted under 35 U.S.C. 154(b) by 0 days.

(21) Appl. No.: 18/154,410

(22) Filed: Jan. 13, 2023

(65) Prior Publication Data

US 2023/0152481 A1    May 18, 2023

Related U.S. Application Data (63) Continuation of application No. 16/668,761, filed on Oct. 30, 2019, now Pat. No. 11,555,940.
(Continued)

(51) Int. Cl.
*G01D 5/20* (2006.01)
*G01D 5/14* (2006.01)
(Continued)

(52) U.S. Cl.
CPC ............ *G01V 3/081* (2013.01); *G01D 5/145* (2013.01); *G01D 5/20* (2013.01); *G01D 5/2258* (2013.01); *H01F 21/10* (2013.01)

(58) Field of Classification Search
CPC ........ G01D 5/142; G01D 5/145; G01D 5/147; G01D 5/20; G01D 5/2006; G01D 5/202;
(Continued)

(56) References Cited

U.S. PATENT DOCUMENTS

| 4,739,272 A | 4/1988 | Griffin et al. |
| 5,003,260 A | 3/1991 | Auchterlonie |

(Continued)

FOREIGN PATENT DOCUMENTS

| EP | 2881715 | 6/2015 |
| JP | 2016-109569 | 6/2016 |
| WO | WO 2014/053836 | 4/2014 |

OTHER PUBLICATIONS

English machine translation of the detailed description of JP2016109569A to Katsuyoshi, obtained from https://worldwide.espacenet.com/advancedSearch?locale=en_ep, obtained on Dec. 4, 2021 (Year: 2021).

(Continued)

*Primary Examiner* — David M Schindler
(74) *Attorney, Agent, or Firm* — Dority & Manning, P.A.

(57) ABSTRACT

Inductive position sensors for sensing relative position (e.g., relative rotary position) between members are provided. In one example implementation, the inductive position sensor includes a transmit aerial having at least one transmit winding. The inductive position sensor can include a receive aerial having one or more receive windings. The inductive position sensor can include a coupling element operable to be disposed on the second member. The inductive position sensor can include processing circuitry configured to provide one or more signals indicative of the position of the first member relative to the second member based on current induced in the one or more receive windings resulting from an oscillating signal provided to the transmit winding. The inductive position sensor includes at least one electrostatic shield. The electrostatic shield can include a plurality of conductive traces arranged so that no current loops are formed in the electrostatic shield.

10 Claims, 12 Drawing Sheets

Related U.S. Application Data (60) Provisional application No. 62/753,138, filed on Oct. 31, 2018, provisional application No. 62/857,554, filed on Jun. 5, 2019.

(51) Int. Cl.
*G01D 5/22* (2006.01)
*G01V 3/08* (2006.01)
*H01F 21/10* (2006.01)

(58) Field of Classification Search
CPC .... G01D 5/2026; G01D 5/204; G01D 5/2053; G01D 5/206; G01D 5/2066; G01D 5/2073; G01D 5/22; G01D 5/2208; G01D 5/2225; G01D 5/2233; G01D 5/225; G01D 5/2266; G01D 5/2275; G01D 5/2283; H01F 21/10; G01V 3/081
See application file for complete search history.

(56) References Cited

U.S. PATENT DOCUMENTS

| | | | |
|---|---|---|---|
| 5,608,691 A * | 3/1997 | MacLauchlan | B06B 1/04 367/140 |
| 5,815,091 A | 9/1998 | Dames et al. | |
| 6,011,389 A | 1/2000 | Masreliez et al. | |
| 6,124,708 A | 9/2000 | Dames | |
| 7,208,945 B2 | 4/2007 | Jones et al. | |
| 7,319,319 B2 | 1/2008 | Jones et al. | |
| 7,528,597 B2 | 5/2009 | Taylor et al. | |
| 9,453,934 B2 | 9/2016 | Hughes | |
| 9,958,480 B2 | 5/2018 | Nejatali et al. | |
| 10,698,544 B2 | 6/2020 | Staszak et al. | |
| 10,856,452 B1 | 12/2020 | Fiori, Jr. | |
| 2001/0029329 A1 | 10/2001 | Avrin et al. | |
| 2005/0225320 A1 | 10/2005 | Lee | |
| 2011/0109303 A1 | 5/2011 | Zhitomirsky | |
| 2011/0204883 A1 | 8/2011 | Konno et al. | |
| 2013/0069637 A1 | 3/2013 | Kobayashi et al. | |
| 2014/0167788 A1 | 6/2014 | Fontanet | |
| 2014/0327432 A1 * | 11/2014 | Elliott | G01D 5/2066 324/207.16 |
| 2018/0224301 A1 | 8/2018 | Herrmann et al. | |
| 2019/0170539 A1 * | 6/2019 | Howard | G01D 5/2053 |

OTHER PUBLICATIONS

PCT International Search Report and Written Opinion for corresponding PCT Application No. PCT/GB2019/053109, dated Jan. 16, 2020, 12 pages.

* cited by examiner

POSITION SENSING APPARATUS AND METHOD

PRIORITY CLAIM

The present application is a continuation of U.S. application Ser. No. 16/668,761, titled "Position Sensing Apparatus and Method," filed on Oct. 30, 2019, which claims the benefit of priority of U.S. Provisional Application Ser. No. 62/753,138, titled "Position Sensing Apparatus and Method," filed on Oct. 31, 2018, and which claims the benefit of priority of U.S. Provisional Application Ser. No. 62/857,554, titled "Position Sensing Apparatus and Method," filed on Jun. 5, 2019. Applicant claims priority to and the benefit of each of such applications and incorporate all such applications herein by reference in its entirety.

FIELD

The present disclosure relates generally to sensing relative position between two members.

BACKGROUND

Various forms of inductive position sensors are known for detecting the position of a first member relative to a second member. In some instances, one member can carry a transmit aerial and a receive aerial while the other member can carry a coupling element. The transmit aerial and the receive aerial can be arranged so that, in the absence of the coupling element, a magnetic field generated by alternating current flowing through the transmit aerial induces a null signal in the receive aerial (the transmit aerial and the receive aerial are then referred to as balanced). However, in the presence of the coupling element, a magnetic field generated by alternating current flowing through the transmit aerial induces an electromotive force in the receive aerial that generates a current that is dependent on the position of the coupling element relative to the transmit and receive aerials. By analysing this current, the relative position of the two members can be determined.

SUMMARY

Aspects and advantages of embodiments of the present disclosure will be set forth in part in the following description, or may be learned from the description, or may be learned through practice of the embodiments.

One example aspect of the present disclosure is directed to an inductive position sensor configured to detect relative position between a first member and a second member. The inductive position sensor includes a transmit aerial configured to be disposed on the first member. The transmit aerial can have at least one transmit winding. The inductive position sensor can include a receive aerial configured to be disposed on the first member. The receive aerial can include one or more receive windings. The inductive position sensor can include a coupling element operable to be disposed on the second member. The inductive position sensor can include processing circuitry configured to provide one or more signals indicative of the position of the first member relative to the second member based on current induced in the one or more receive windings resulting from an oscillating signal provided to the transmit winding. The inductive position sensor includes at least one electrostatic shield. The electrostatic shield can include a plurality of conductive traces arranged so that no current loops are formed in the electrostatic shield.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to position sensors (e.g., rotary position sensors) and more particularly, to inductive position sensors having electrostatic protection to reduce interference. The electrostatic interference can be from high voltage sources, such as high voltage electric motors. For instance, high voltage electric motors are being increasingly used in automotive and other applications. These high voltage sources can cause interference in inductive position sensors, such as inductive rotary position sensors. This interference can include, for instance, low frequency electrostatic coupling of the high voltage source(s) to the inductive sensors.

For instance, in some embodiments, an inductive position sensor can determine relative position between two members, such as a first member and a second member. The inductive position sensor can include a transmit aerial arranged on the first member. The transmit aerial can include a transmit winding. The inductive position sensor can include a receive aerial arranged on the first member. The receive aerial can include one or more windings, such as a first winding (e.g., a sine winding) and a second winding (e.g., a cosine winding). The inductive position sensor can include a coupling element on the second member. The coupling element can include one or more conductive regions and/or one or more regions of ferromagnetic material.

An oscillating signal can be provided to the transmit winding of the transmit aerial. The oscillating signal provided to the transmit aerial can induce electromotive forces in the receive windings(s) of the receive aerial. In the presence of the coupling element on the second member, a magnetic field generated by alternating current flowing through the transmit aerial induces an electromotive force in the receive aerial that generates a current that is dependent on the position of the coupling element relative to the transmit and receive aerials. In this way, the sensor can be used to detect the relative position (e.g., rotary position) between the two members.

According to example aspects of the present disclosure, an inductive position sensor (e.g., inductive rotary position sensor) can include one or more electrostatic shields to reduce interference with the inductive position sensor. The electrostatic shield(s) can include a one or more conductive traces arranged so that no current loops are formed in the electrostatic shield(s). The electrostatic shield is grounded. The electrostatic shield can be disposed on a printed circuit board or other substrate associated with the inductive position sensor. For instance, in some embodiments, the electrostatic shield(s) can be disposed on the same layer as windings associated with the inductive position sensor. In some embodiments, the electrostatic shield(s) can be disposed on one or more different layers in the printed circuit board as windings associated with the inductive position sensor. In some embodiments, the electrostatic shield can be integrated into a housing used to house various components of the inductive position sensor. This can provide a low impedance path to ground for the receive winding to reduce interference.

In some embodiments, a capacitor can be coupled between a point on the transmit winding and/or a point on the one or more of the receive windings (e.g., sine winding and/or cosine winding) and ground. The capacitor coupled in this manner can reduce interference on the windings, including low frequency interference.

One example embodiment of the present disclosure is directed to an inductive position sensor configured to detect relative position between a first member and a second member. The inductive position sensor includes a transmit aerial configured to be disposed on the first member. The transmit aerial can have at least one transmit winding. The inductive position sensor can include a receive aerial configured to be disposed on the first member. The receive aerial can include one or more receive windings. The inductive position sensor can include a coupling element operable to be disposed on the second member. The inductive position sensor can include processing circuitry configured to provide one or more signals indicative of the position of the first member relative to the second member based on current induced in the one or more receive windings resulting from an oscillating signal provided to the transmit winding. The inductive position sensor includes at least one electrostatic shield. The electrostatic shield can include a plurality of conductive traces arranged so that no current loops are formed in the electrostatic shield.

Figure 1:
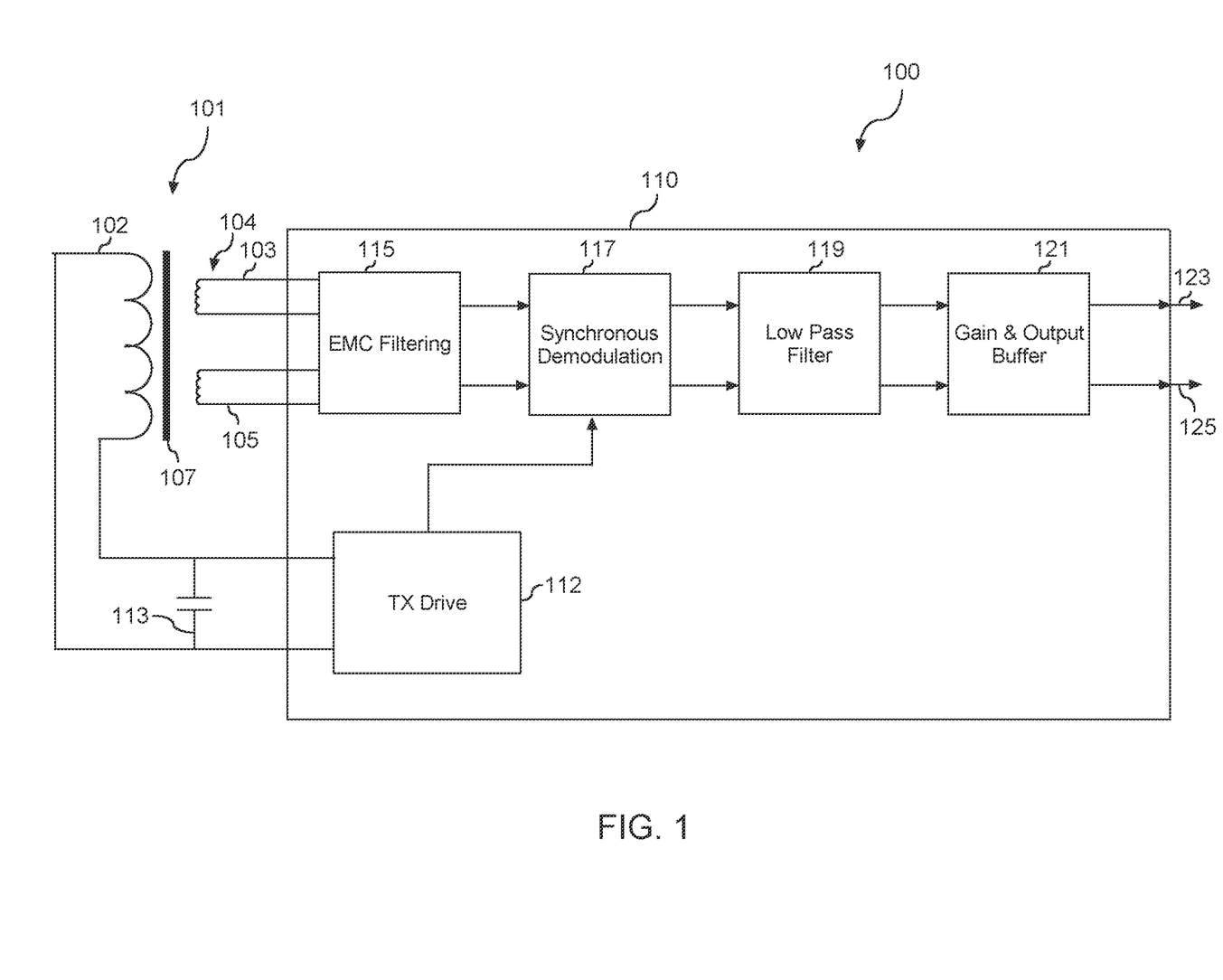
FIG. 1 depicts a schematic of an example inductive position sensor according to example embodiments of the present disclosure.

FIG. 1 depicts a schematic of an example rotary position sensor according to example embodiments of the present disclosure. As shown in FIG. 1, a rotary position sensor 100 has a transmit aerial 102, a receive aerial 104 formed by a sine winding 103 and a cosine winding 105, and an intermediate coupling element 107. The transmit aerial 102 and the receive aerial 104 are formed on a first member (not shown). The intermediate coupling element 107 is formed on a second member (also not shown). The intermediate coupling element 107 can include a conductive material and/or ferromagnetic material. Relative movement (e.g., rotary movement) between the first member and the second member causes a corresponding relative movement between, on the one hand, the transmit aerial 102 and the receive aerial 104, and on the other hand, the intermediate coupling element 107.

The transmit aerial 102, the sine winding 103 and the cosine winding 105 are electrically connected to respective terminals of processing circuitry 110. In this example the processing circuitry 110 is in the form of a semiconductor integrated circuit device, such as an Application Specific Integrated Circuit (ASIC) or an Application Specific Standard Product (ASSP). In other examples, the processing circuitry 110 can use multiple interconnected devices and/or can be implemented using one or more suitable components (e.g., electronic components, such as discrete electronic components).

As shown in FIG. 1, the processing circuitry 110 includes a TX drive stage 112 which generates an oscillating electrical signal for supply to the transmit aerial 102. In this example, the TX drive stage 112 can be a free running oscillator that generates an oscillating electrical signal at a drive frequency determined by the inductance of the transmit aerial 102 and the capacitance of one or more capacitor(s) 113 connected in parallel to the transmit aerial 102. This drive frequency is normally selected to be a few MHz, for example in the range of about 2 MHz to about 5 MHz. As used herein, the use of the term "about" in conjunction with a numerical value is intended to refer to within 20% of the stated numerical value.

Supplying an oscillating current to the transmit aerial 102 induces electromotive forces in the sine winding 103 and the cosine winding 105 of the receive aerial 104, which can cause current to flow in the sine winding 103 and the cosine winding 105. As shown in FIG. 1, the sine winding 103 and the cosine winding 105 are separate windings such that separate currents flow in the sine winding 103 and the cosine winding 105. The sine winding 103 and the cosine winding 105 are electrically connected to separate terminals of the processing circuitry 110, with the current flowing in the sine winding 103 being processed to provide a sine output signal 123 and the current flowing in the cosine winding 105 being processed to provide a cosine output signal 125. The relative magnitudes of the sine output signal 123 and the cosine output signal 125 are indicative of the relative position (e.g., relative rotary position) of the first member and the second member.

On entering the processing circuitry 110, current flowing in the sine winding 103 first goes through an EMC filtering stage 115, to reduce signal components at frequencies away from the drive frequency. The signal components that are reduced may be caused, for example, by interference from electrical signals generated by other nearby electrical components. According to example aspects of the present disclosure and as discussed in more detail below, the inductive position sensor 100 can include one or more electrostatic shields configured to reduce interference from electrical signals generated by other electrical components, such as by a high voltage electric motor.

The filtered electrical signal then goes through a synchronous demodulation stage 117 in which the filtered electrical signal is mixed with a demodulation signal from the TX drive stage 112. The demodulation signal is in phase with the drive signal. As a result of the intermediate coupling element 107 being formed of a conductive material, the electrical signal from the sine winding 103 can be 180° out of phase with the drive signal. The demodulated electrical signal resulting from the synchronous demodulation accordingly has a baseband component whose magnitude varies in dependence on the relative rotary position of the first and second members and high frequency components at twice the drive frequency and at higher harmonics of the drive frequency.

The demodulated electrical signal can pass through a low pass filtering stage 119 to remove the high frequency components corresponding to harmonics of the drive signal, leaving the baseband component. The signal can then pass through gain and output buffer stage 121, which allows an adjustable gain to be applied before the sine output signal 123 is output by the processing circuitry 110.

As will be apparent from FIG. 1, current induced in the cosine winding 105 also undergoes EMC filtering 115, synchronous demodulation 117, low pass filtering 119 and gain and output buffering 121 within the processing circuitry 110 before being output as the cosine output signal 125.

The transmit aerial 102, the sine winding 103 and the cosine winding 105 are formed by conductive traces. The conductive traces can be on a printed circuit board or other substrate that is on disposed on the first member. The intermediate coupling element 107 includes a conductive material (e.g., pattern of conductive material) located on the second member.

Figure 2:
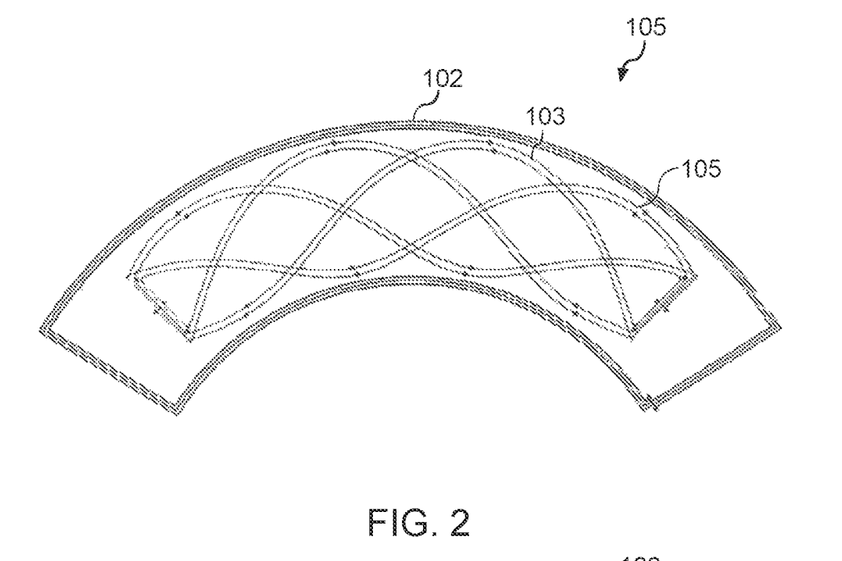
FIG. 2 depicts example windings associated with a transmit aerial and a receive aerial for an inductive position sensor according to example embodiments of the present disclosure.
Figure 4:
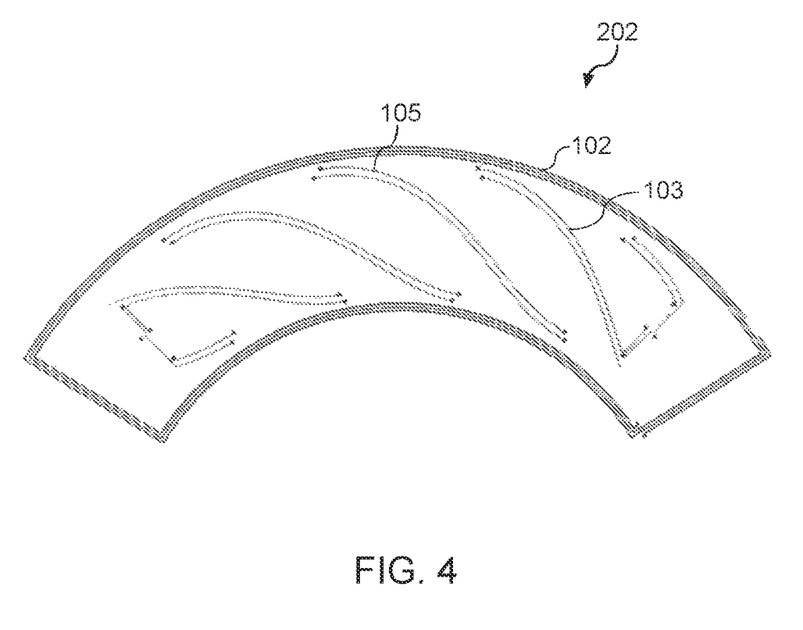
FIG. 4 depicts an example first layer of a multilayer structure associated with a transmit aerial and a receive aerial for an inductive position sensor according to example embodiments of the present disclosure.
Figure 5:
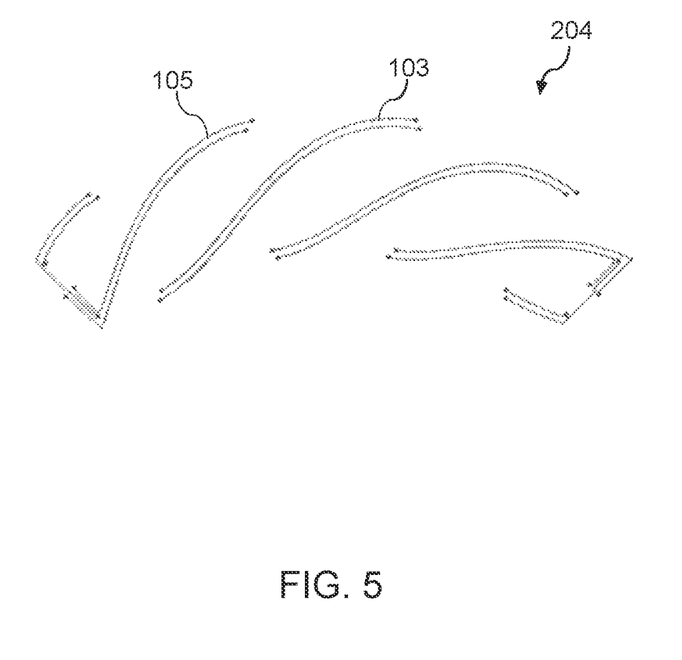
FIG. 5 depicts an example second layer of a multilayer structure associated with transmit aerial and a receive aerial for an inductive position sensor according to example embodiments of the present disclosure.

FIG. 2 depicts one example configuration of a transmit aerial 102, sine winding 103 and cosine winding 105 of an inductive position sensor 100 according to example embodiments of the present disclosure. The transmit aerial 102, sine winding 103 and cosine winding 105 can be disposed on a substrate, such as a printed circuit board. As shown in FIGS. 4 and 5, the transmit aerial 102, sine winding 103, and cosine winding 105 can be configured as a multilayer structure with different components of the transmit aerial 102, sine winding 103, and cosine winding 105 being arranged in different layers of a printed circuit board or other substrate.

More particularly, FIG. 4 depicts a first layer 202 of the inductive position sensor of FIG. 2 according to example aspects of the present disclosure. The first layer 202 includes conductive traces associated with the transmit aerial 102, sine winding 103, and the cosine winding 105. FIG. 5 depicts a second layer 204 of the inductive position sensor of FIG. 2 according to example aspects of the present disclosure. The second layer 204 includes conductive traces associated with the sine winding 103 and cosine winding 105. The first layer 202 and the second layer 204 can be disposed, for instance, on opposite sides of a printed circuit board or other substrate. In some embodiments, the first layer 202 and the second layer 204 can be disposed on different substrates. The first layer 202 and the second layer 204 can be connected, for instance, by vias.

Figure 3:
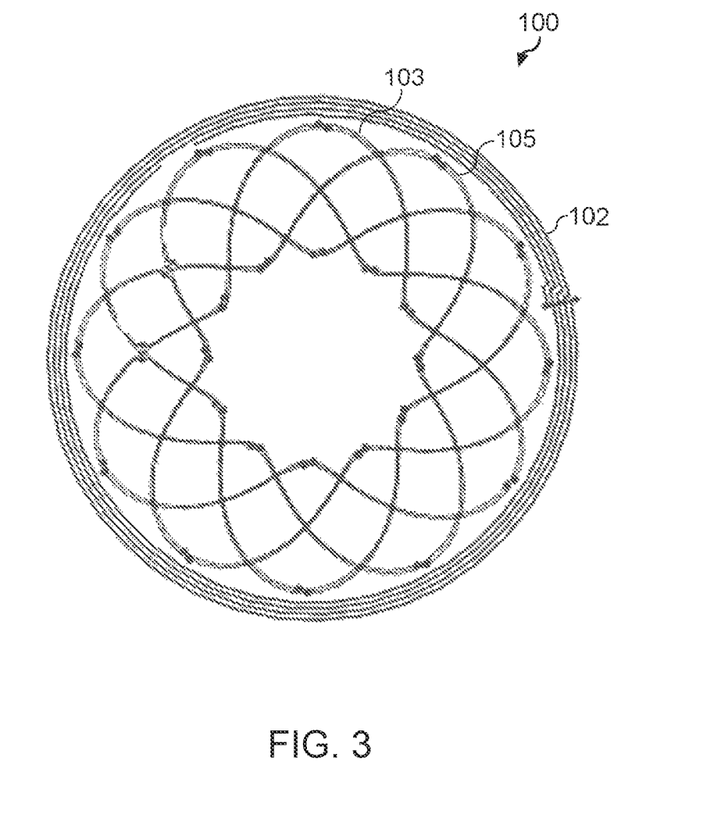
FIG. 3 depicts example windings associated with a transmit aerial and a receive aerial for an inductive position sensor according to example embodiments of the present disclosure.
Figure 6:
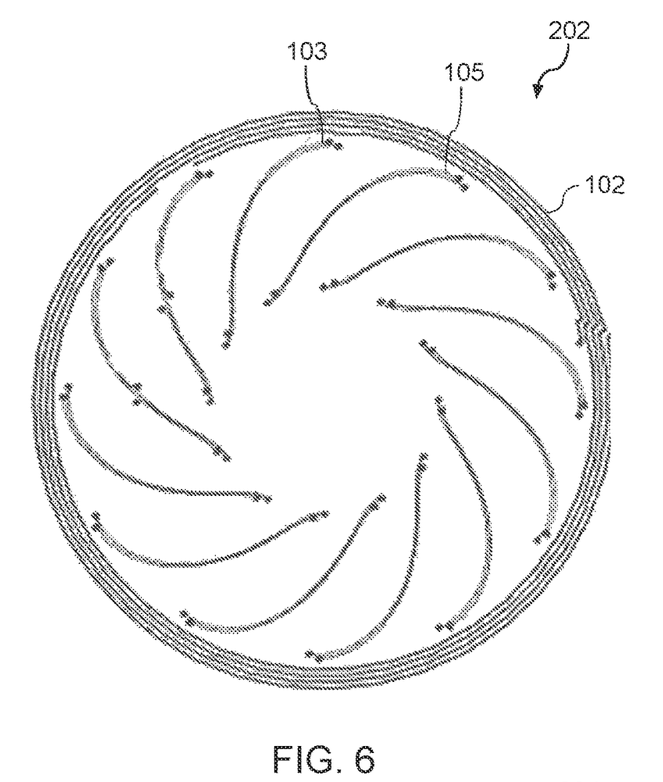
FIG. 6 depicts an example first layer of a multilayer structure associated with a transmit aerial and a receive aerial for an inductive position sensor according to example embodiments of the present disclosure.
Figure 7:
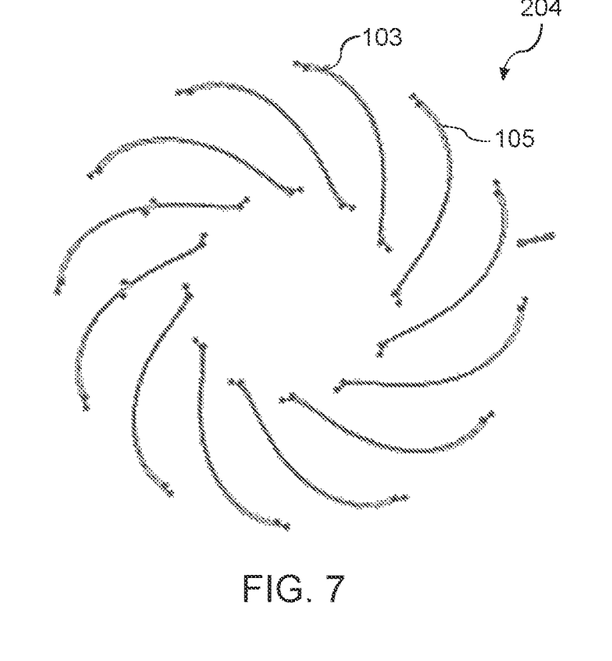
FIG. 7 depicts an example second layer of a multilayer structure associated with transmit aerial and a receive aerial for an inductive position sensor according to example embodiments of the present disclosure.

FIG. 3 depicts another example configuration of a transmit aerial 102, sine winding 103 and cosine winding 105 of an inductive position sensor 100 according to example embodiments of the present disclosure. The transmit aerial 102, sine winding 103 and cosine winding 105 can be disposed on a substrate, such as a printed circuit board. As shown in FIGS. 6 and 7, the transmit aerial 102, sine winding 103, and cosine winding 105 can be configured as a multilayer structure with different components of the transmit aerial 102, sine winding 103, and cosine winding 105 being arranged in different layers of a printed circuit board or other substrate.

More particularly, FIG. 6 depicts a first layer 202 of the inductive position sensor of FIG. 3 according to example aspects of the present disclosure. The first layer 202 includes conductive traces associated with the transmit aerial 102, sine winding 103, and the cosine winding 105. FIG. 7 depicts a second layer 204 of the inductive position sensor of FIG. 3 according to example aspects of the present disclosure. The second layer 204 includes conductive traces associated with the sine winding 103 and cosine winding 105. The first layer 202 and the second layer 204 can be disposed, for instance, on opposite sides of a printed circuit board or other substrate. In some embodiments, the first layer 202 and the second layer 204 can be disposed on different substrates. The first layer 202 and the second layer 204 can be connected, for instance, by vias.

According to example aspects of the present disclosure, an inductive position sensor can include one or more electrostatic shields disposed proximate to the transmit aerial and receive aerial to reduce electromagnetic interference. In some embodiments, the electrostatic shield(s) can be disposed on different layer(s) relative to the layers associated with the transmit aerial and receive aerial.

Figure 8:
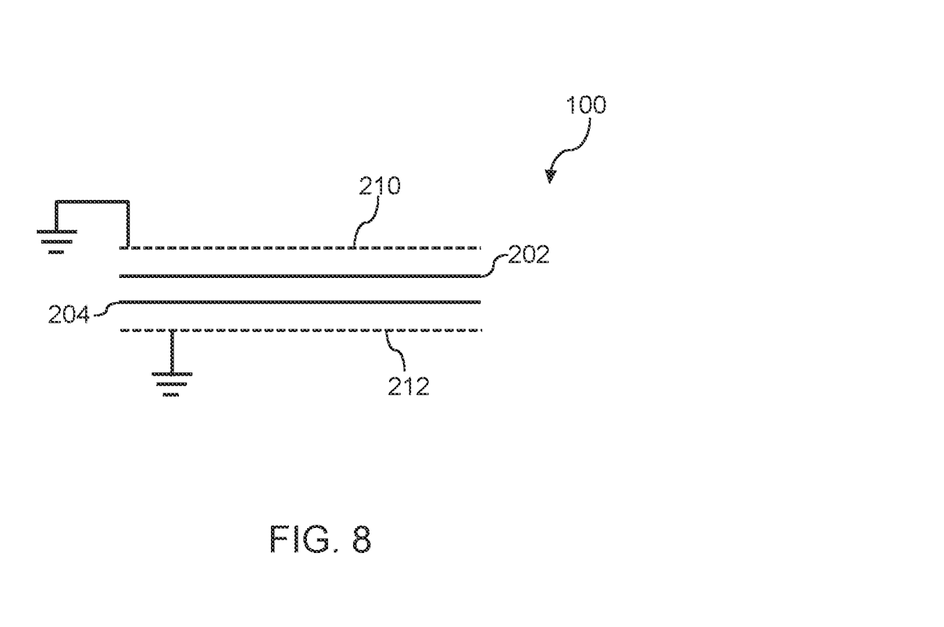
FIG. 8 depicts an example multilayer structure for an inductive position sensor having a plurality of electrostatic shields according to example embodiments of the present disclosure.

For instance, FIG. 8 depicts an example multilayer structure for a transmit aerial and receive aerial of an inductive position sensor 100 according to example embodiments of the present disclosure. The multilayer structure 100 can include a first layer 202 and a second layer 204. The first layer 202 can include conductive traces associated with the transmit aerial and/or the receive aerial. For instance, the first layer 202 can be the first layer 202 illustrated in FIG. 4 or FIG. 6. The second layer 204 can include conductive traces associated with the transmit aerial and/or the receive aerial. For instance, the second layer 204 can be the second layer 204 illustrated in FIG. 5 or FIG. 7.

The inductive position sensor can include a first electrostatic shield layer 210 and a second electrostatic shield layer 212. The first electrostatic shield layer 210 can be grounded. The second electrostatic shield layer 212 can be grounded. The first electrostatic shield layer 210 and the second electrostatic shield layer 212 can be arranged in the multilayer structure such that the layer(s) associated with the transmit aerial and the receive aerial (e.g., layers 202 and 204) are located between the first electrostatic shield layer 210 and the second electrostatic shield layer 212.

FIG. 8 depicts an example embodiment having two electrostatic shield layers for purposes of illustration and discussion. Those of ordinary skill in the art, using the disclosures provided herein, will understand that any number of electrostatic shield layers can be used without deviating from the scope of the present disclosure. For instance, the inductive position sensor can have a single electrostatic shield layer arranged next to the first layer 202 or the second layer 204.

Each of the electrostatic shields 210, 212 can include a plurality of conductive traces that are connected to ground. The conductive traces can be arranged such that no current loops are formed on the electrostatic shield 210, 212. Example configurations of electrostatic shields 210, 212 are set forth in FIGS. 9-13.

Figure 9:
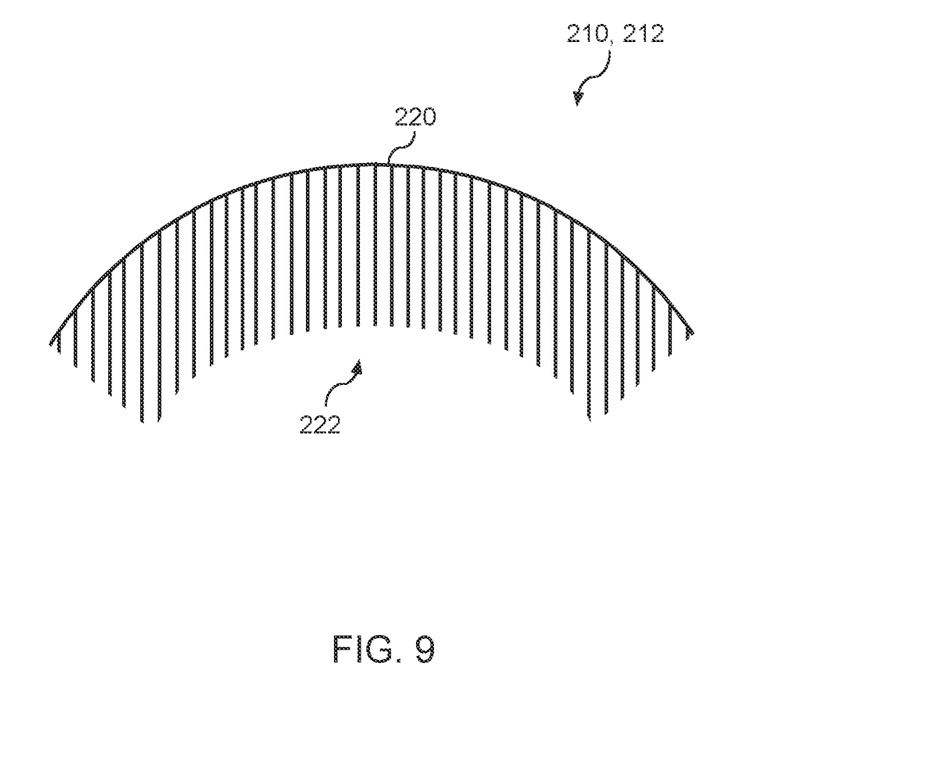
FIG. 9 depicts an example electrostatic shield according to example embodiments of the present disclosure.

For instance, FIG. 9 depicts an example configuration of an electrostatic shield 210, 212 according to example embodiments of the present disclosure. The electrostatic shield 210, 212 includes an arcuate first conductive trace 220 that extends from a first end to a second end in an arcuate manner. The electrostatic shield 210, 212 further includes a plurality of second conductive traces 222. Each of the second conductive traces 222 extends in a direction away from the first conductive trace 220. The second conductive traces 222 can each have the same length or different lengths.

Figure 10:
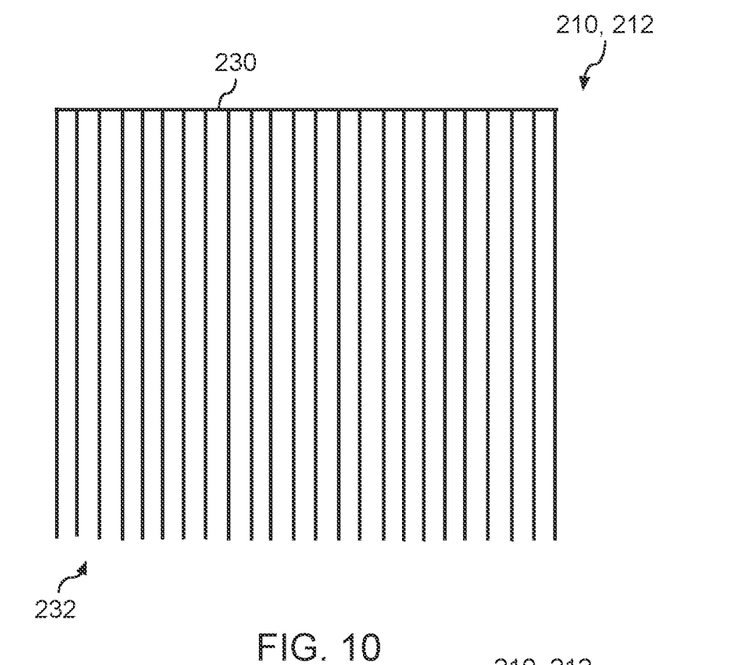
FIG. 10 depicts an example electrostatic shield according to example embodiments of the present disclosure.

FIG. 10 depicts an example configuration of an electrostatic shield 210, 212 according to example embodiments of the present disclosure. The electrostatic shield 210, 212 includes a linear first conductive trace 230 that extends from a first end to a second end in a linear manner. The electrostatic shield 210, 212 further includes a plurality of second conductive traces 232. Each of the second conductive traces 232 extends in a direction away from the first conductive trace 230. The second conductive traces 232 can each have the same length or different lengths.

Figure 11:
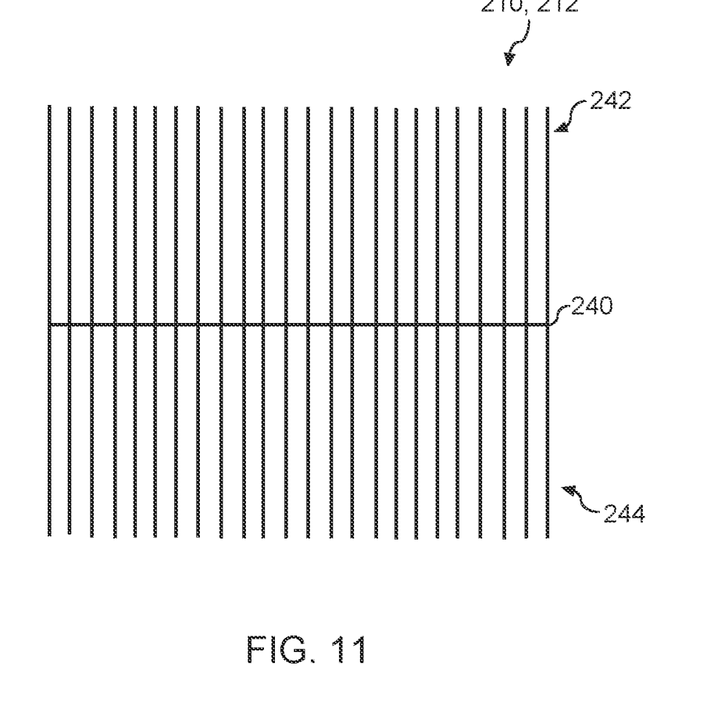
FIG. 11 depicts an example electrostatic shield according to example embodiments of the present disclosure.

FIG. 11 depicts an example configuration of an electrostatic shield 210, 212 according to example embodiments of the present disclosure. The electrostatic shield 210, 212 includes a linear first conductive trace 240 that extends from a first end to a second end in a linear manner. The electrostatic shield 210, 212 further includes a plurality of second conductive traces 242. Each of the second conductive traces 242 extends in a first direction away from the first conductive trace 240. The second conductive traces 242 can each have the same length or different lengths. The electrostatic shield 210, 212 can further include a plurality of third conductive traces 244. Each of the third conductive traces 244 extends in a second direction away from the first conductive trace 240. The second direction can be different than the first direction. The third conductive traces 244 can each have the same length or different lengths.

Figure 12:
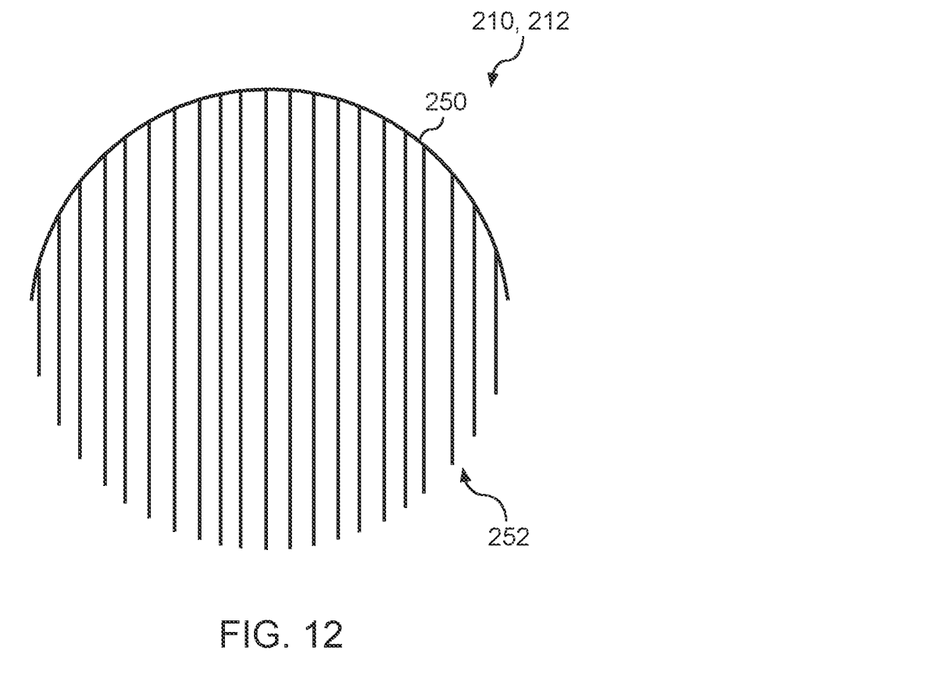
FIG. 12 depicts an example electrostatic shield according to example embodiments of the present disclosure.

FIG. 12 depicts an example configuration of an electrostatic shield 210, 212 according to example embodiments of the present disclosure. The electrostatic shield 210, 212 includes a first conductive trace 250 that extends from a first end to a second end in an arcuate manner. The electrostatic shield 210, 212 further includes a plurality of second conductive traces 252. Each of the second conductive traces 252 extends in a direction away from the first conductive trace 250. The second conductive traces 252 can each have a length such that the ends of the second conductive traces 252 form an arcuate shape.

Figure 13:
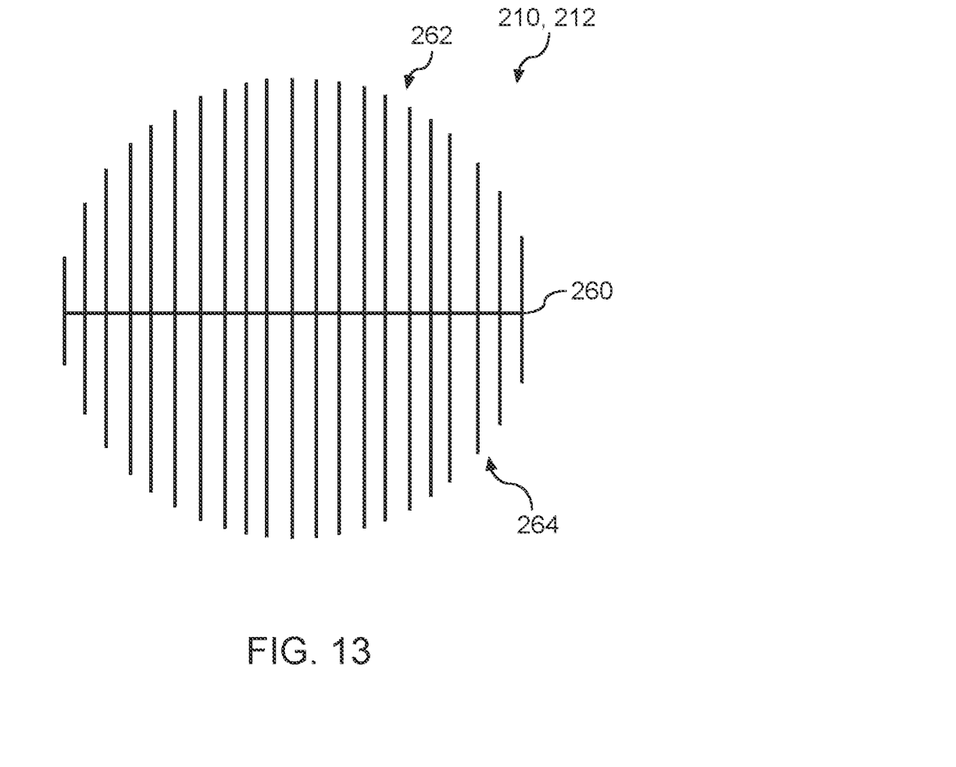
FIG. 13 depicts an example electrostatic shield according to example embodiments of the present disclosure.

FIG. 13 depicts an example configuration of an electrostatic shield 210, 212 according to example embodiments of the present disclosure. The electrostatic shield 210, 212 includes a linear first conductive trace 260 that extends from a first end to a second end in a linear manner. The electrostatic shield 210, 212 further includes a plurality of second conductive traces 262. Each of the second conductive traces 262 extends in a first direction away from the first conductive trace 260. The second conductive traces 262 can each have a length such that the ends of the second conductive traces 262 form an arcuate shape. The electrostatic shield 210, 212 can further include a plurality of third conductive traces 264. Each of the third conductive traces 264 extends in a second direction away from the first conductive trace 260. The second direction can be different than the first direction. The third conductive traces 264 can each have a length such that the ends of the second conductive traces 264 form an arcuate shape.

The configurations of the electrostatic shields 210, 212 depicted in FIGS. 9-13 are provided for example purposes. Other configurations of electrostatic shields can be used without deviating from the scope of the present disclosure.

Figure 14:
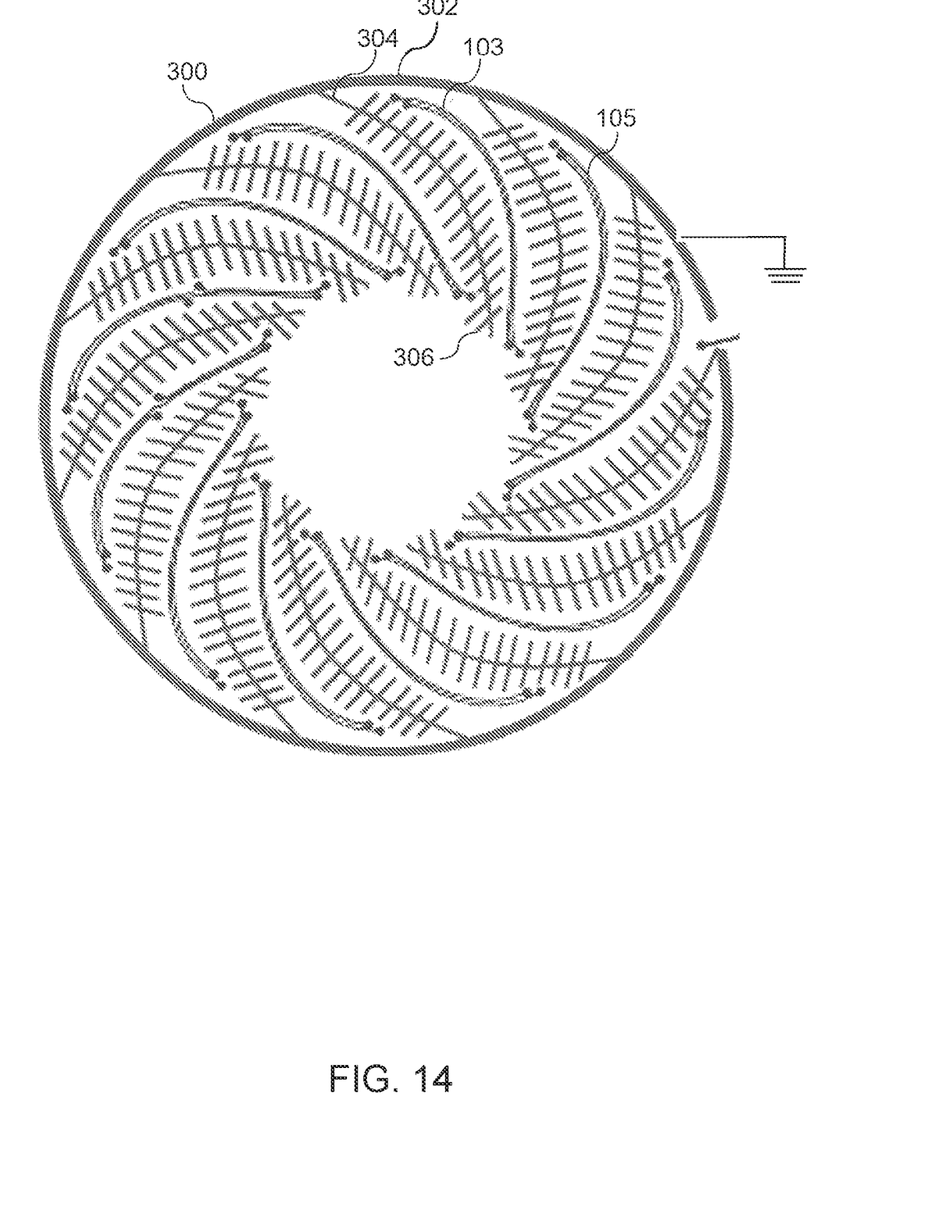
FIG. 14 depicts an example electrostatic shield disposed on a same layer as a layer associated with a transmit aerial and/or receive aerial of an inductive position sensor according to example embodiments of the present disclosure.

In some embodiments, the electrostatic shield(s) can be formed on a same layer as one or more conductive traces associated with the transmit aerial and/or receive aerial. For example, FIG. 14 depicts an electrostatic shield 300 that is formed in the same layer as conductive traces associated with a sine winding and cosine winding of an inductive position sensor. In particular, the electrostatic shield 300 is formed in the second layer 204 associated with the inductive position sensor 100 of FIG. 3. The second layer 204 without the electrostatic shield 300 is shown in FIG. 7.

The electrostatic shield 300 of FIG. 14 is grounded and includes a plurality of conductive traces that are arranged so that no current loops are formed in the electrostatic shield 300. The electrostatic shield 300 includes a first conductive trace 302 that at least partially surrounds the conductive traces associated with the sine winding 103 and the cosine winding 105. A plurality of second conductive traces 304 extend from the first conductive trace 302. The plurality of second conductive traces 304 can extend from the first conductive trace 302 such that each second conductive trace is disposed between a trace associated with the sine winding 103 and a trace associated with the cosine winding 105. A plurality of third conductive traces 306 can extend from the second conductive traces 304. The plurality of third conductive traces 306 can extend in any direction and can have the same or different lengths. The third conductive traces 306 can also be arranged so as not to overlap or intersect with any traces associated with the sine winding 103 or the cosine winding 105.

Figure 15:
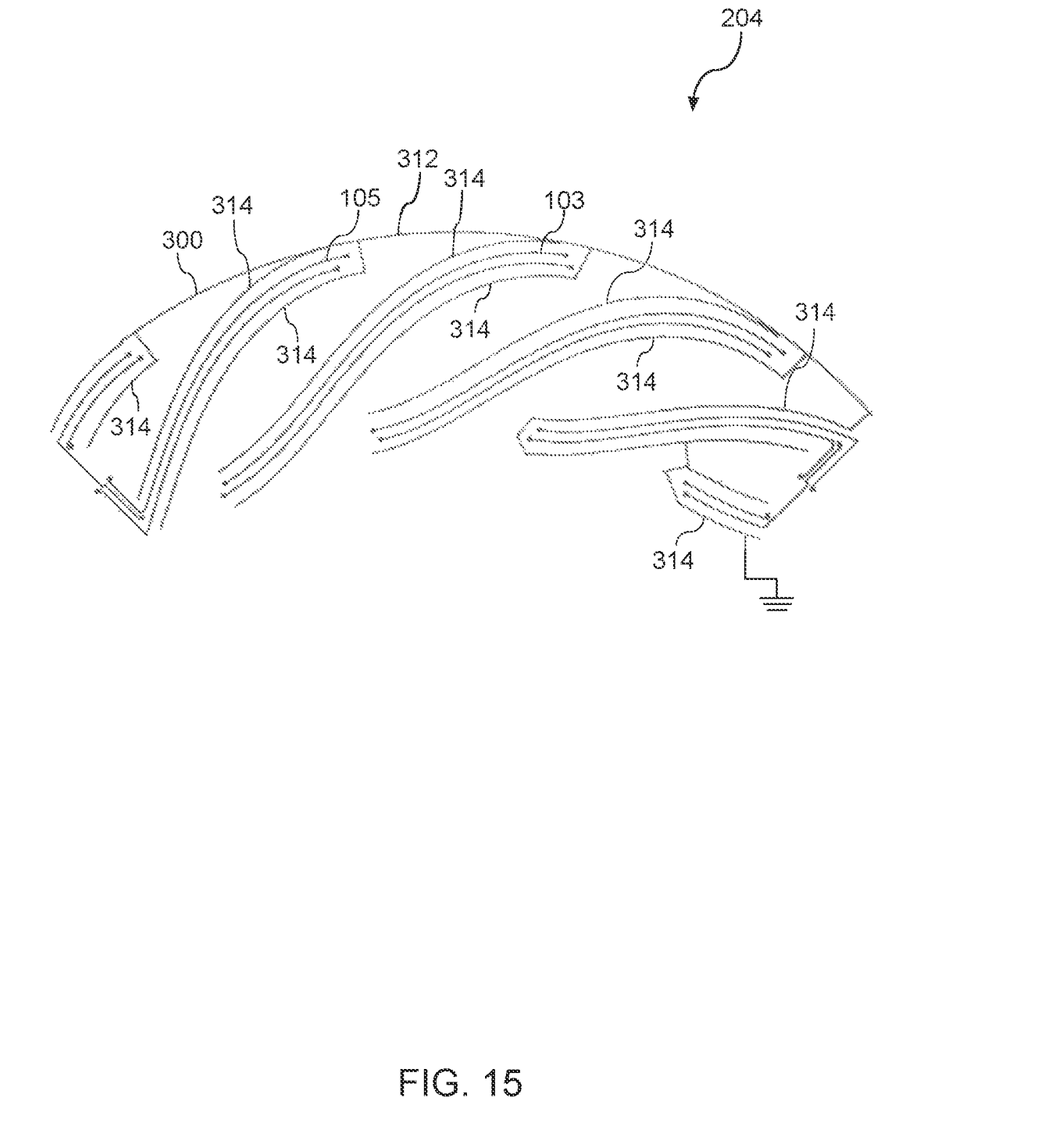
FIG. 15 depicts an example electrostatic shield disposed on a same layer as a layer associated with a transmit aerial and/or receive aerial of an inductive position sensor according to example embodiments of the present disclosure.

FIG. 15 depicts an electrostatic shield 300 that is formed in the same layer as conductive traces associated with a sine winding and cosine winding of an inductive position sensor. In particular, the electrostatic shield 300 is formed in the second layer 204 associated with the inductive position sensor 100 of FIG. 2. The second layer 204 without the electrostatic shield 300 is shown in FIG. 5.

The electrostatic shield 300 of FIG. 15 is grounded and includes a plurality of conductive traces that are arranged so that no current loops are formed in the electrostatic shield 300. The electrostatic shield 300 includes a first conductive trace 312 that extends in an arcuate manner from a first end and a second end. A plurality of second conductive traces 314 extend from the first conductive trace 312. The plurality of second conductive traces 314 can extend from the first conductive trace 312 such that the second conductive traces 314 at least partially surround conductive traces associated with the sine winding 103 and the cosine winding 105.

Figure 16:
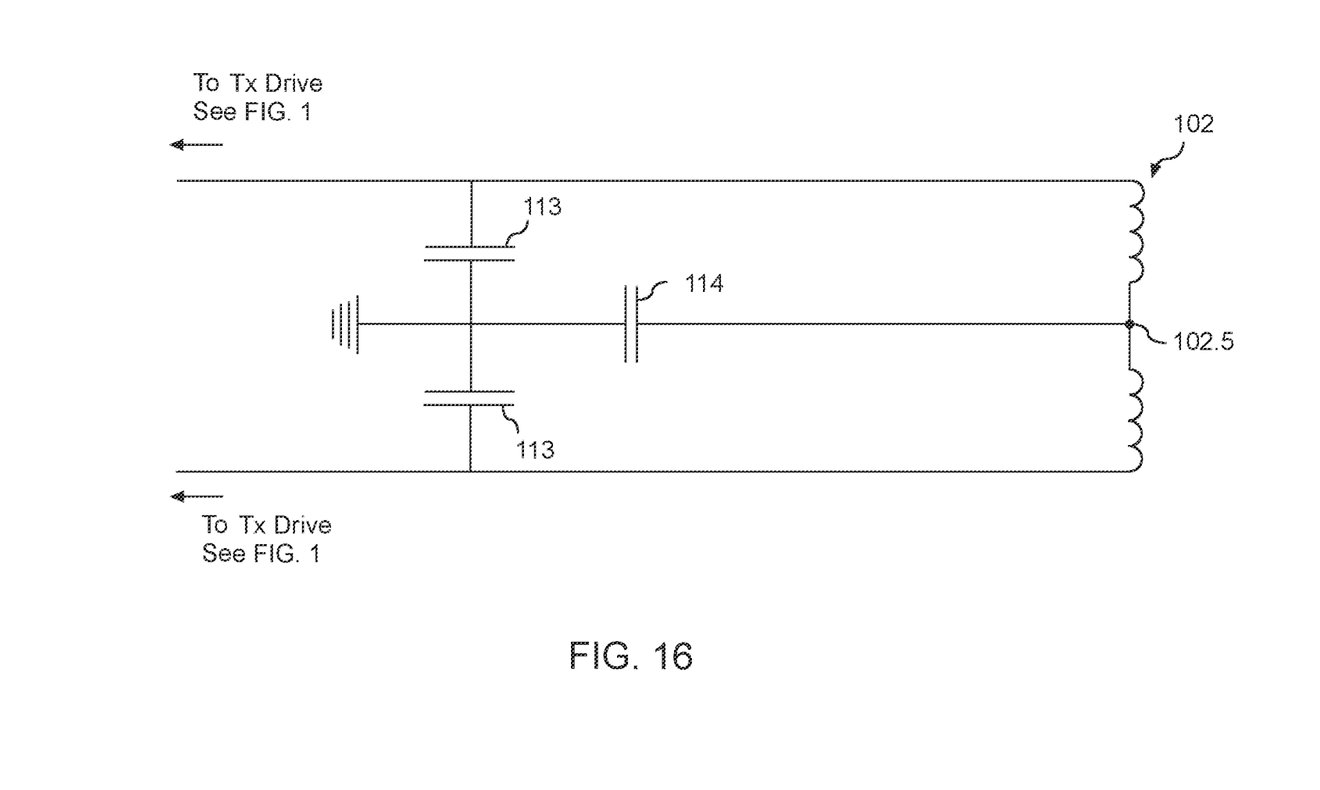
FIG. 16 depicts a schematic of an example transmit aerial portion of an inductive position sensor according to example embodiments of the present disclosure.

FIG. 16 depicts a schematic of an example transmit aerial according to example embodiments of the present disclosure. The transmit aerial 102 configuration is similar to that of FIG. 1, except that a point 102.5 of the transmit aerial winding is connected to ground, for instance via a capacitor 114. This can reduce electrostatic fields coupling through the coils, reducing low frequency electrostatic interference. This same principal can be applied to the receive aerial windings, such as the sine winding 103 and/or the cosine winding 105.

Figure 17:
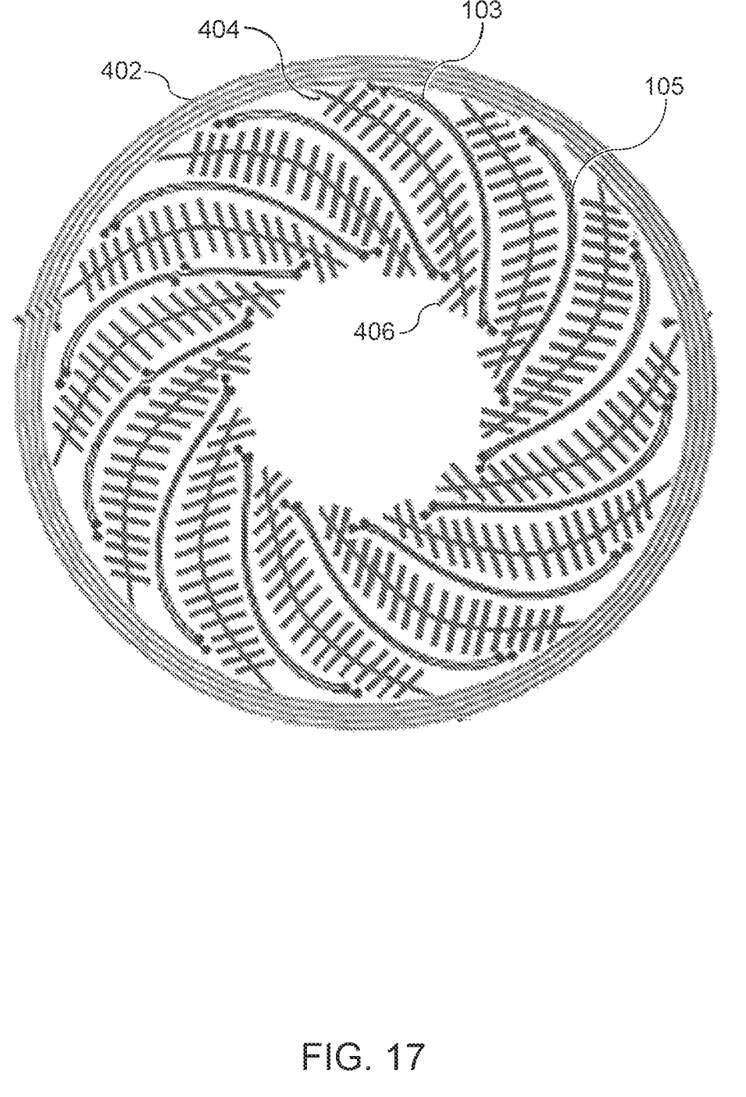
FIG. 17 depicts example windings associated with a transmit aerial and a receive aerial for an inductive position sensor according to example embodiments of the present disclosure.

FIG. 17 depicts another example of a transmit aerial 102, sine winding 103 and cosine winding 105 of an inductive position sensor 100 according to example embodiments of the present disclosure. In some implementations, the electrostatic shield 400 discussed above with reference to FIG. 14 can be integrally formed with the transmit aerial 102. For instance, the transmit aerial 102 can include a first conductive trace 402 that at least partially surrounds the conductive traces associated with the sine winding 103 and the cosine winding 105. The transmit aerial 102 can include a plurality of second conductive traces 404. As shown, each of the plurality of second conductive traces 404 can extend from the first conductive trace 402 such that each of the plurality of second conductive traces 404 is disposed between a trace associated with the sine winding 103 and a trace associated with the cosine winding 105. The transmit aerial 102 can include a plurality of third conductive traces 406 that extend from each of the second plurality of second conductive traces 404. The plurality of third conductive traces 406 can extend in any direction and can have the same or different lengths. The plurality of third conductive traces 406 can also be arranged so as to not overlap or intersect with any traces associated with the sine winding 103 or the cosine winding 105.

Figure 18:
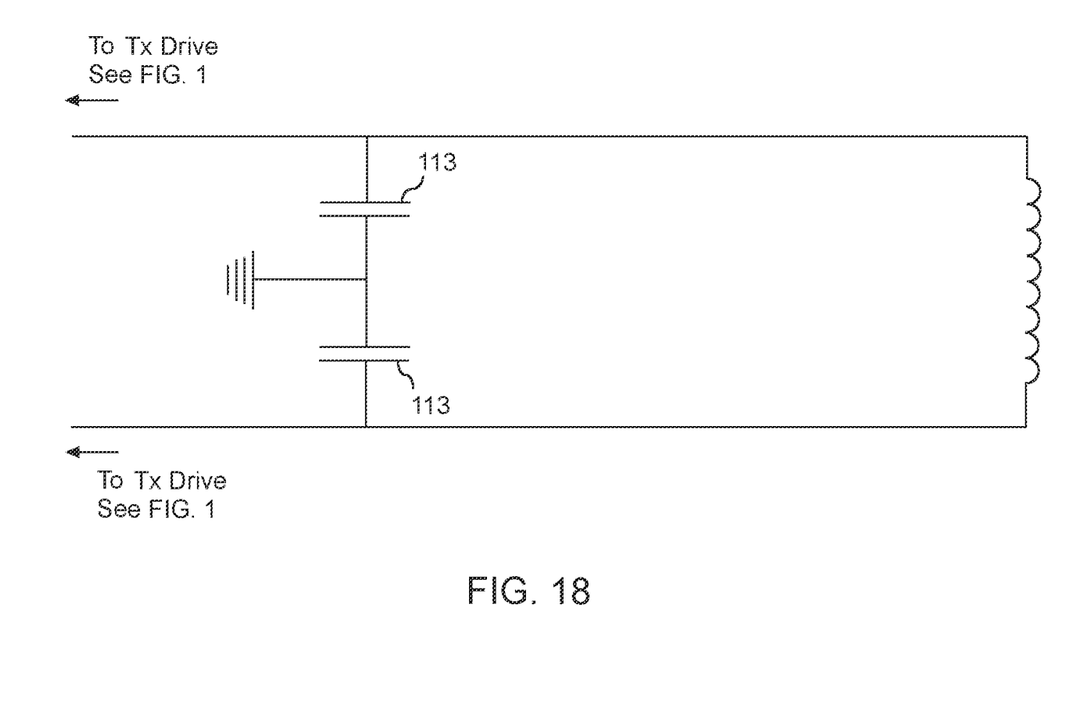
FIG. 18 depicts a schematic of an example transmit aerial portion of an inductive position sensor according to example embodiments of the present disclosure.

FIG. 18 depicts a schematic of an example transmit aerial 102 according to example embodiments of the present disclosure. The transmit aerial 102 configuration of FIG. 18 is similar to the transmit aerial configuration of FIG. 16. However, the transmit aerial 102 configuration of FIG. 18 does not include the capacitor 114 (FIG. 16) coupled between ground and the point 102.5 (FIG. 16) of the transmit aerial 102.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An inductive position sensor configured to detect relative position between a first member and a second member, the inductive position sensor comprising:
    a transmit aerial configured to be disposed on the first member, the transmit aerial having at least one transmit winding;
    a receive aerial configured to be disposed on the first member, the receive aerial comprising one or more receive windings, the one or more receive windings comprising at least one of a sine winding and a cosine winding;
    a coupling element operable to be disposed on the second member;
    processing circuitry configured to provide one or more signals indicative of the position of the first member relative to the second member based on current induced in the one or more receive windings resulting from an oscillating signal provided to the transmit winding; and
    at least one electrostatic shield formed in a same layer as the one or more receiving windings, the electrostatic shield comprising a plurality of conductive traces arranged so that no current loops are formed in the electrostatic shield, the plurality of conductive traces comprising a first conductive trace extending from a first end portion to a second end portion; and a plurality of second conductive traces extending from the first conductive trace, wherein each of the plurality of second conductive traces has an arcuate shape, wherein the electrostatic shield further comprises a plurality of third conductive traces extending from one or more of the plurality of second conductive traces.

2. The inductive position sensor of claim 1, wherein the electrostatic shield is grounded.

3. The inductive position sensor of claim 1, wherein the first conductive trace extends from the first end portion to the second end portion in an arcuate manner.

4. The inductive position sensor of claim 1, the one or more receive windings comprising the sine winding and the cosine winding, wherein the plurality of second conductive traces extend from the first conductive trace such that each second conductive trace is disposed between a trace associated with the sine winding and a trace associated with the cosine winding.

5. The inductive position sensor of claim 1, wherein the first conductive trace at least partially around a portion of the one or more receive windings.

6. A inductive position sensor, the inductive position sensor comprising:
    one or more receive windings, the one or more receive windings comprising at least one of a sine winding and a cosine winding, the one or more receive windings associated with at least one electrostatic shield formed in a same layer as the one or more receiving windings, the electrostatic shield comprising a plurality of conductive traces arranged so that no current loops are formed in the electrostatic shield, the plurality of conductive traces comprising a first conductive trace extending from a first end portion to a second end portion; and a plurality of second conductive traces extending from the first conductive trace, wherein each of the plurality of second conductive traces has an arcuate shape, wherein the electrostatic shield further comprises a plurality of third conductive traces extending from one or more of the plurality of second conductive traces.

7. The inductive position sensor of claim 6, wherein the electrostatic shield is grounded.

8. The inductive position sensor of claim 6, wherein the first conductive trace extends from the first end portion to the second end portion in an arcuate manner.

9. The inductive position sensor of claim 6, the one or more receive windings comprising the sine winding and the cosine winding, wherein the plurality of second conductive traces extend from the first conductive trace such that each second conductive trace is disposed between a trace associated with the sine winding and a trace associated with the cosine winding.

10. The inductive position sensor of claim 6, wherein the first conductive trace that at least partially around a portion of the one or more receive windings.

* * * * *